United States Patent
Klinger (10) Patent No.: US 9,871,873 B2
(45) Date of Patent: Jan. 16, 2018

(54) ADAPTER FOR COMMUNICATION BETWEEN WEB APPLICATIONS WITHIN A BROWSER

(71) Applicant: Uwe Klinger, Bad Schonborn (DE)

(72) Inventor: Uwe Klinger, Bad Schonborn (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 14/550,503

(22) Filed: Nov. 21, 2014

(65) Prior Publication Data
US 2016/0150028 A1    May 26, 2016

(51) Int. Cl.
G06F 15/16    (2006.01)
H04L 29/08    (2006.01)

(52) U.S. Cl.
CPC .............. H04L 67/16 (2013.01); H04L 67/02 (2013.01); H04L 67/10 (2013.01)

(58) Field of Classification Search
CPC ............................ H04L 41/0293; H04L 67/16
See application file for complete search history.

(56) References Cited

U.S. PATENT DOCUMENTS

| | | | | |
|---|---|---|---|---|
| 2003/0093402 A1* | 5/2003 | Upton | ...................... | G06F 9/541 |
| 2004/0199763 A1* | 10/2004 | Freund | ..................... | G06F 21/53 |
| | | | | 713/154 |
| 2008/0172496 A1* | 7/2008 | Middleton | ............. | G06Q 30/02 |
| | | | | 709/246 |
| 2010/0180330 A1* | 7/2010 | Zhu | ........................ | G06F 21/335 |
| | | | | 726/10 |
| 2013/0014126 A1* | 1/2013 | Zana | ........................ | G06F 9/54 |
| | | | | 719/313 |

* cited by examiner

*Primary Examiner* — Esther B Henderson
(74) *Attorney, Agent, or Firm* — Buckley, Maschoff & Talwalkar, LLC (57) ABSTRACT

A method, medium, and system to receive a request for the first web resource to access the second web resource; request authorization to access to the second web resource by the first web resource; receive authorization to grant access to the second web resource for the first web resource; transmit an application programming interface (API) call from the first web resource to the second web resource for the first web resource having authorized access to the second web resource; and transmit a reply to the API call from the second web resource to the first web resource.

23 Claims, 7 Drawing Sheets

```
┌─────────────────────────────────────────────────────┐
│  RECEIVE A REQUEST FOR A FIRST WEB RESOURCE TO      │
│  ACCESS A SECOND WEB RESOURCE                       │
│                                                 205 │
└─────────────────────────────────────────────────────┘
                           │
                           ▼
┌─────────────────────────────────────────────────────┐
│  REQUEST AUTHORIZATION TO ACCESS TO THE SECOND      │
│  WEB RESOURCE BY THE FIRST WEB RESOURCE             │
│                                                 210 │
└─────────────────────────────────────────────────────┘
                           │
                           ▼
┌─────────────────────────────────────────────────────┐
│  RECEIVE AUTHORIZATION TO GRANT ACCESS TO THE       │
│  SECOND WEB RESOURCE FOR THE FIRST WEB RESOURCE     │
│                                                 215 │
└─────────────────────────────────────────────────────┘
                           │
                           ▼
┌─────────────────────────────────────────────────────┐
│  TRANSMIT AN APPLICATION PROGRAMMING INTERFACE (API)│
│  CALL FROM THE FIRST WEB RESOURCE TO THE SECOND WEB │
│  RESOURCE FOR THE FIRST WEB RESOURCE HAVING         │
│  AUTHORIZED ACCESS TO THE SECOND WEB RESOURCE       │
│                                                 220 │
└─────────────────────────────────────────────────────┘
                           │
                           ▼
┌─────────────────────────────────────────────────────┐
│  TRANSMIT A REPLY TO THE API CALL FROM THE          │
│  SECOND WEB RESOURCE TO THE FIRST WEB RESOURCE      │
│                                                 225 │
└─────────────────────────────────────────────────────┘
```

ADAPTER FOR COMMUNICATION BETWEEN WEB APPLICATIONS WITHIN A BROWSER

BACKGROUND

Web resources may be limited in some respects with when and how they may communicate with each other. In some aspects, a desired communication or interoperability between different web resources may not have been contemplated at the time the web resources were developed and deployed for use. Subsequent to their development, a desire or need to communicate with different web resources may be desired by service providers and service consumers.

In some contexts, such as a cloud-based system, service, or application, there may be an expectation of availability and communication between different web resources by users of the system, service, or application. Accordingly, communication between the different web resources may be desired.

DETAILED DESCRIPTION

Figure 1:
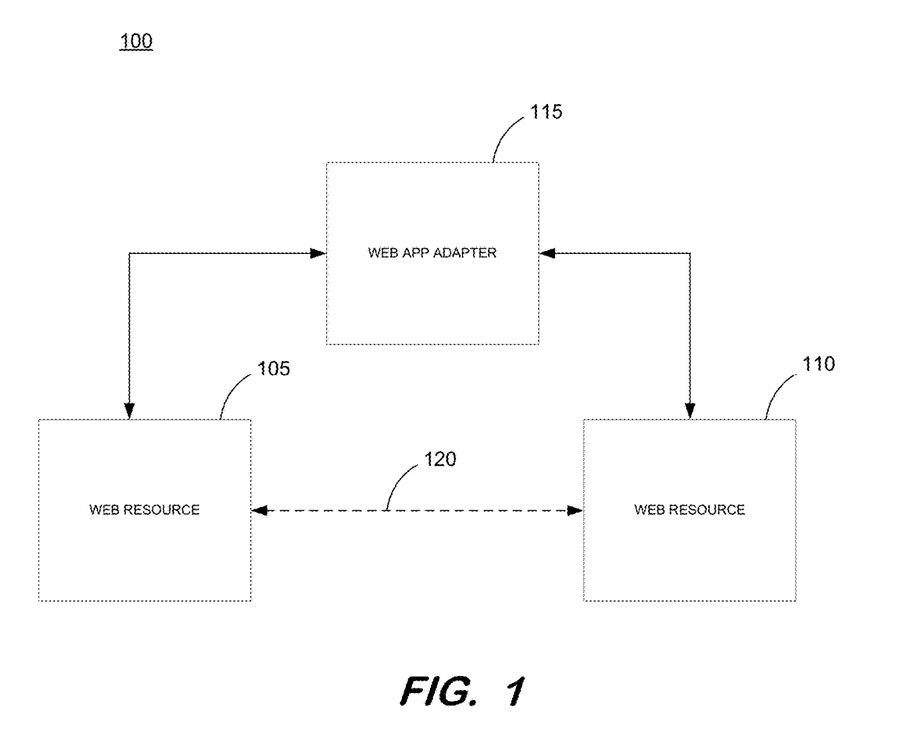
FIG. 1 is a block diagram of a system, according to some embodiments.

FIG. 1 is a block diagram of a system 100, according to some embodiments herein. System 100 represents a logical architecture for describing processes and a framework for a web application adapter to provide a mechanism connect applications at different domains and to connect to multiple different applications having different security provisions and different communication protocols. In some embodiments, a first web resource 105 and a second web resource 110 may be either a web page or a web service. In some instances, web resource 105 may be designed to provide a service to another web resource such as web resource 110 is a web application having a set of functionalities. The functionalities of the web resource 110 may be determined by a developer of the web application. After development and deployment, the functionalities of the web resource 110 are fixed.

In some contexts, web resource 105 and web resource 110 may not be configured to communicate with each other. Communication between the two web resources may be prohibited or otherwise not possible due to the two web resources being on different domains and communication between the two is permitted only when they are in the same domain. This type of limitation may be present when the web resources are both web pages, both web services, or a combination thereof. In some aspects, communication between the two web resources may be prohibited if, for example, the servers implementing the different web pages and/or web services do not use the same domain.

In some instances, communication between two web resources may be limited or prohibited based on a difference in communication protocol(s) used by the different web resources. The web resources may have pre-defined rules and protocols that govern how each of the web resources interact with other web resources. In some instances, the communication or messaging protocols of the different web resources may not be compatible with each other and the web resource may not be able to communicate with each as natively designed.

In some aspects, security mechanisms and features may prevent different web resources from communicating with each other. For example, web resource 105 (e.g., a messaging application) may not be designed to access another web resource (e.g., a social network service) due to, at least, security mechanism designed into the messaging application and/or the social network service.

In some embodiments, communication between web resource 105 and web resource 110 is illustrated as being desired but not permissible by the dashed line 120. In some aspects, the desired communication connection between the two web resources 105 and 110 is not permissible for at least one desired purpose or extent. As developed and implemented, communication between web resources 105 and 110 may be limited due to one or more constraints of the web resources, including but not limited to those specifically discussed herein. In some aspects, a need or desire for the web resources 105 and 110 to communicate with each other may have been unforeseen.

In order to provide or otherwise facilitate a communication connection between web resources 105 and 110, web app adapter 115 may operate to provide an authorized connection between the two web resources. In some aspects, web app adapter 115 may operate to requests authorizations between different web resources, including for example a service consumer and a service provider. Web app adapter may further operate to implement the communication between the different web resources (e.g., a service consumer and a service provider).

In some embodiments, web app adapter 115 may be separate and distinct from the web resources 105 and 110. In this manner, web resources herein need not be modified in order to communicate with each other in accordance with some embodiments herein even though the web resources may not have been developed to include the functionality of communicating with each other. In some embodiments, web app adapter 115 may be implemented as a web browser plug-in. Accordingly, the web app adapter is not a part of a web resource that may include a web page and a web service. Other implementations of the web resource are possible and the web browser plug-in implementation is a non-limiting example. In some aspects, the implementation and configuration of web app adapter 115 may provide a communication connection between different web resources without a need to modify the web resources and the backend systems in support thereof.

In some aspects, the web app adapter herein may be configured to have higher or greater privileges than the web resources it "brokers" communication for since it provides a level of access and communication not possible or permissible to the extent desired or requested by the web resources without the intervention of the web app adapter.

Being a logical architecture for describing processes and a framework for a web application adapter to provide a mechanism connect applications at different domains and to connect to multiple different applications having different security provisions and different communication protocols, system 100 may include a web app adapter 115 that provides communication between two or more different web pages and web services.

Figure 2:
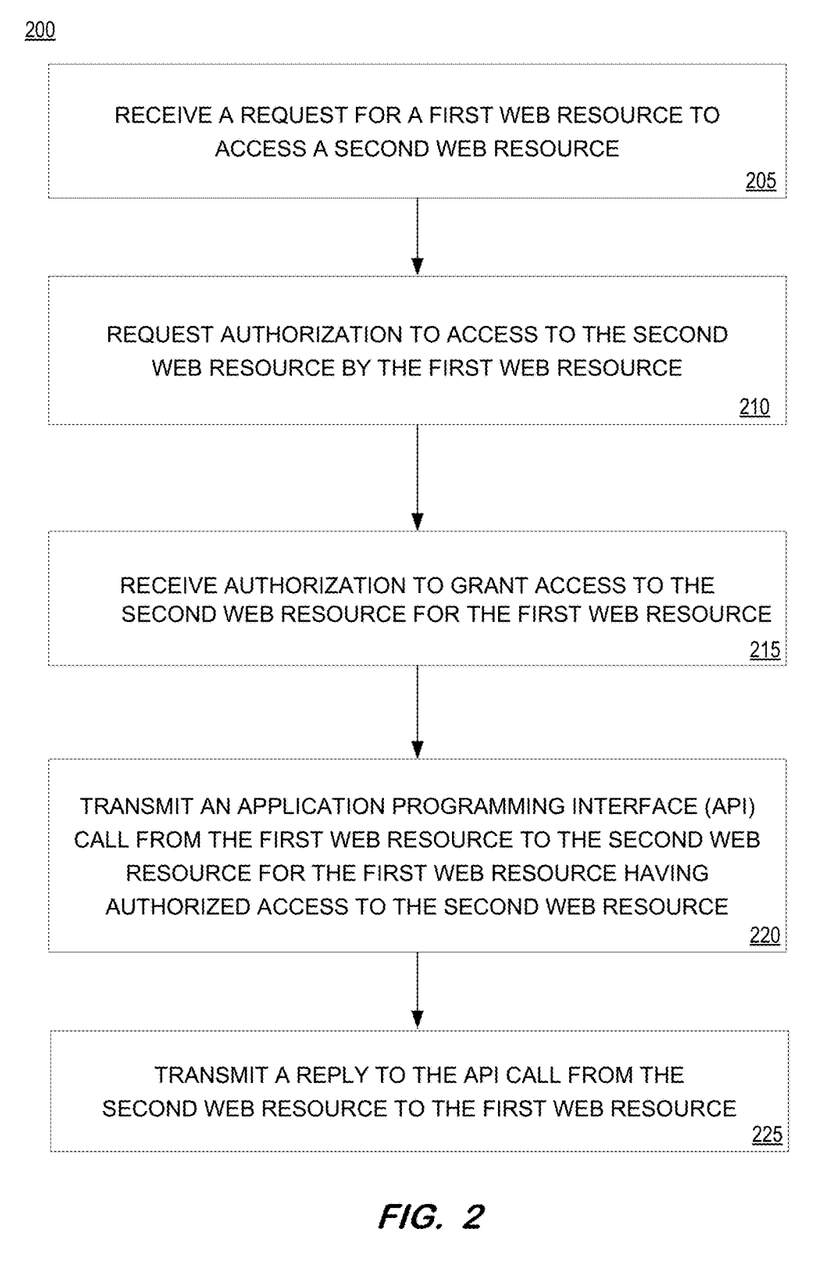
FIG. 2 is an illustrative flow diagram of a process, according to some embodiments.

Referring to FIG. 2, a process related to providing a platform or web app adapter for different web resources to communicate with each other where the web resources are not designed or otherwise permitted to communicate with each other to an extent or purpose desired is depicted. Process 200 may be implemented by a system, application, or apparatus configured to execute the operations of the process. In some embodiments, various hardware elements of an apparatus, device or system embodying system 100 executes program instructions to perform process 200. In some embodiments, hard-wired circuitry may be used in place of, or in combination with, program instructions for implementation of processes according to some embodiments. Program instructions that can be executed by a system, device, or apparatus to implement process 200 (and other processes disclosed herein) may be stored on or otherwise embodied as non-transitory, tangible media. Embodiments are therefore not limited to any specific combination of hardware and software.

Prior to operation 205, web resources such as a web page or a web service or web application executing on a device or a server-side computing device (e.g., an application server) may be developed and deployed to one or more device(s). The web resources may be developed to communicate with certain other web resources, to the exclusion of other web resources for which it is not designed or developed to communicate with.

At operation 205, a web adapter herein receives a request for a first web resource to access a second web resource. The first web resource may want to access the second web resource in order to, for example, provide additional functionality to a first web resource. For example, a first web page or web service may want to enhance or modify a second web page by providing enhancements to the second web page's user interface.

At operation 210, the web app adapter may operate to request authorization to access the second web resource. In some aspects, the request may specify which web page (e.g., an embedded iframe) or web service (e.g. a URL, etc.) for which access is being requested. In some aspects, the request may include an indication of the type of action the access may entail, such as for example, the execution of JavaScript.

In some aspects, operation 210 may include determining whether the access of the request has already been granted. For example, by a prior request similar to that of operation 205. In the instance the access has not been previously granted by a user, administrator, or service that maintains, for example, a list of authorized/approved web resources and applications, then the request may be sent to the user, administrator, or service.

At operation 215, a reply to the authorization to access the target web resource is received by the web app adapter. The reply may include authorization to grant access to the target web resource. In some embodiments, authorization may be denied in the instance the particular type of access or the extent of the access is not acceptable by a user. In some aspects herein, a user's consent is requested and received before the access to a target web resource is granted. In this manner, a web app adapter herein may not, perhaps maliciously, request and gain access to a web resource without the consent and approval of a user. The user may typically be either a user of an application or a web page or web service administrator or other entity having a role/responsibility of overseeing at least an aspect of the security or maintenance of the web resource for a user or a user group of, for example, a company or other organization.

At operation 220, upon grant of access to the desired web resource, the web app adapter may expose an application programming interface, API, to the first web resource. The first web resource may call the API to perform a function of the first web resource in an effort to provide a functionality or service based on the granted communication access between the first web resource and the second web resource.

At operation 225, a reply to the API call is provided back to the first web resource (e.g., web application or service or page). In some aspects, the authorized access to the second web resources may be granted for an unrestricted purpose and/or length of time. In some other instances, the authorized and granted access may be limited to a specific time duration or communication session or a combination thereof. In some instances, the purpose of the authorized may be a limiting factor. Accordingly, when the specified purpose is accomplished, then access may no longer be granted.

Figure 3:
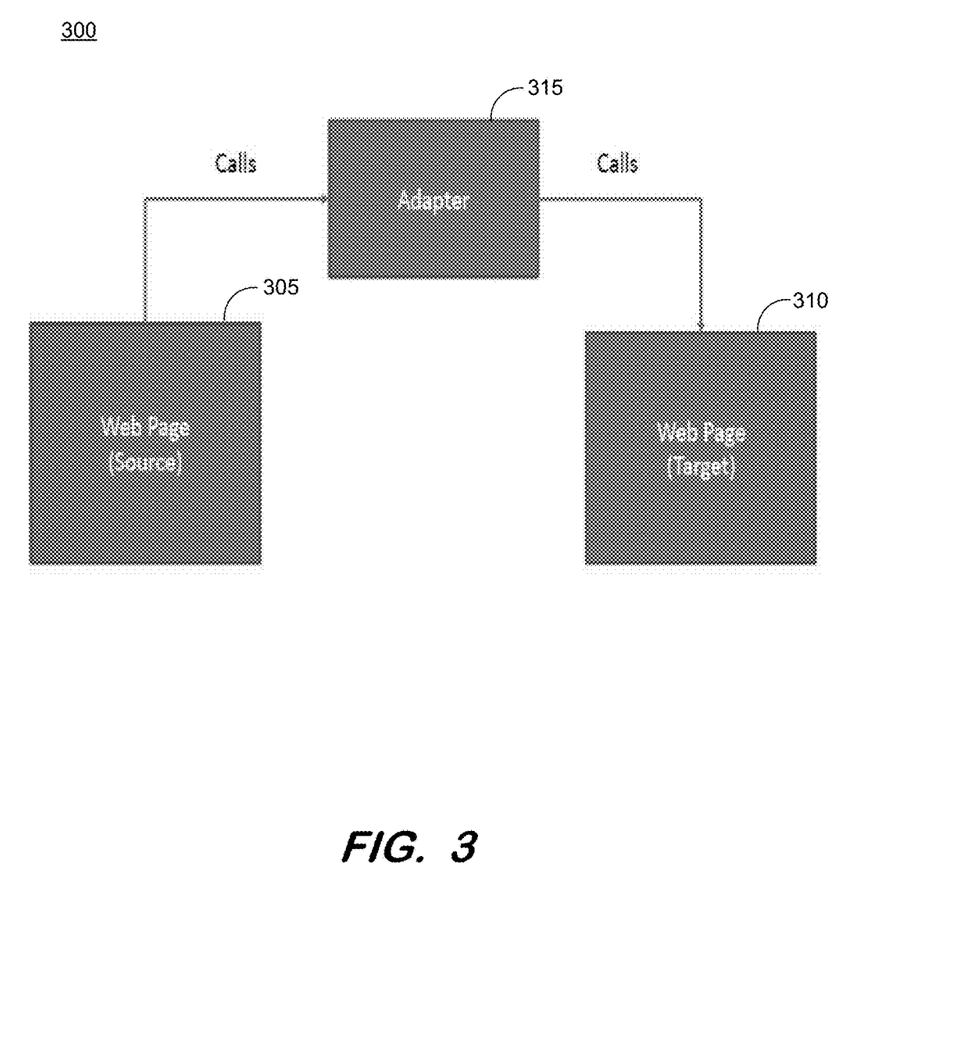
FIG. 3 is an illustrative depiction of a communication configuration, in accordance with some embodiments.

FIG. 3 is an illustrative example of a type of communication facilitated, at least in part, by the web app adapter of some embodiments disclosed herein. FIG. 3 includes a depiction of a first or source web page 305 that is granted authorized access to a target, second web page 310. The process of granting access may include aspects of process 200. In some aspects, communication between web page 305 and web page 310 may previously have been prohibited since the web pages are on different domains. Web adapter 315 may operate to enable communication therebetween. Upon having authorized access, web page 305 may execute JavaScript calls, access a DOM tree of web page 310, and other functions in the target web page 310.

Figure 4:
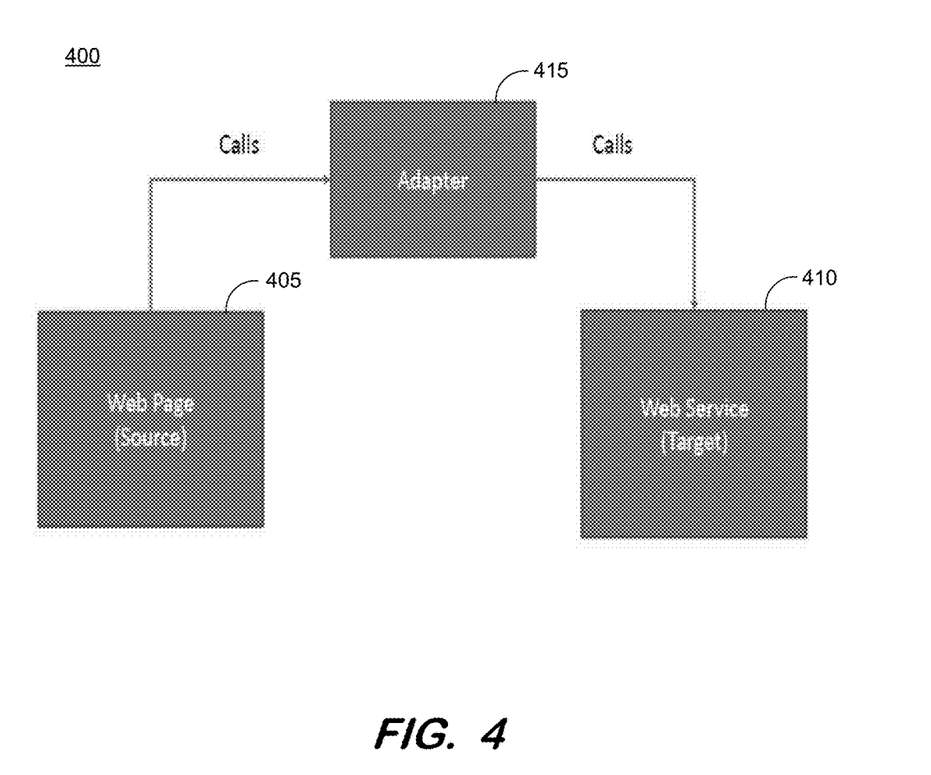
FIG. 4 is an illustrative depiction of a communication configuration, according to some embodiments.

FIG. 4 is an illustrative example of a type of communication facilitated, at least in part, by the web app adapter of some embodiments disclosed herein. FIG. 4 includes a depiction of a first or source web page 405 that is granted authorized access to a target web service 310. The process of granting access may include aspects of process 200. In some aspects, communication between web page 405 and web service 410 may previously have been prohibited since the source web page and the target web service execute on different domains. Web adapter 415 may operate to enable communication therebetween.

Figure 5:
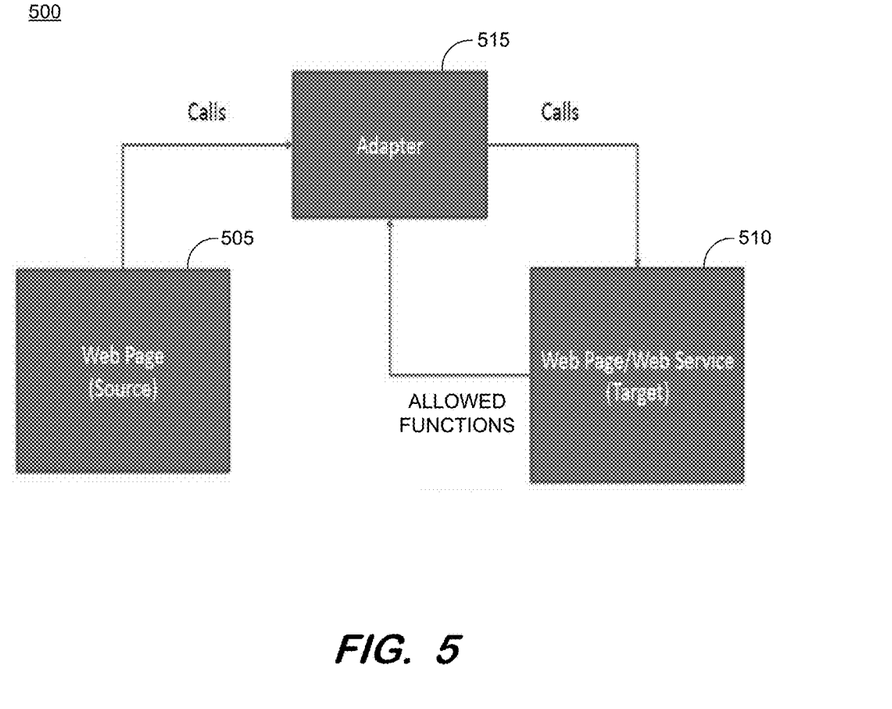
FIG. 5 is an illustrative depiction of a communication configuration, according to some embodiments.

FIG. 5 is an illustrative example of a type of communication facilitated, at least in part, by a web app adapter 515 of some embodiments disclosed herein. FIG. 5 includes a depiction of a first or source web page 505 that is granted authorized access to a target web service or web page 510 for a specific or limited purpose. The process of granting access may include aspects of process 200, including a specification of the specific purpose of the access grant request. In some aspects, communication between web page 505 and web service or web page 510 may include a call from the source web page 505 to the web app adapter 515 and the target web page/web service providing an indication of the permissible or allowed functions regarding access thereto. Web resource 510 may register its list of allowed or permissible function(s) for granting access with web app adapter 515. Web app adapter 515 may refer to the listing of allowed functions when determining whether to grant access to web resource 510. In the event the request for access to web resource 510 is one of the allowed functions, then access may be granted in accordance with other aspects herein.

Figure 6:
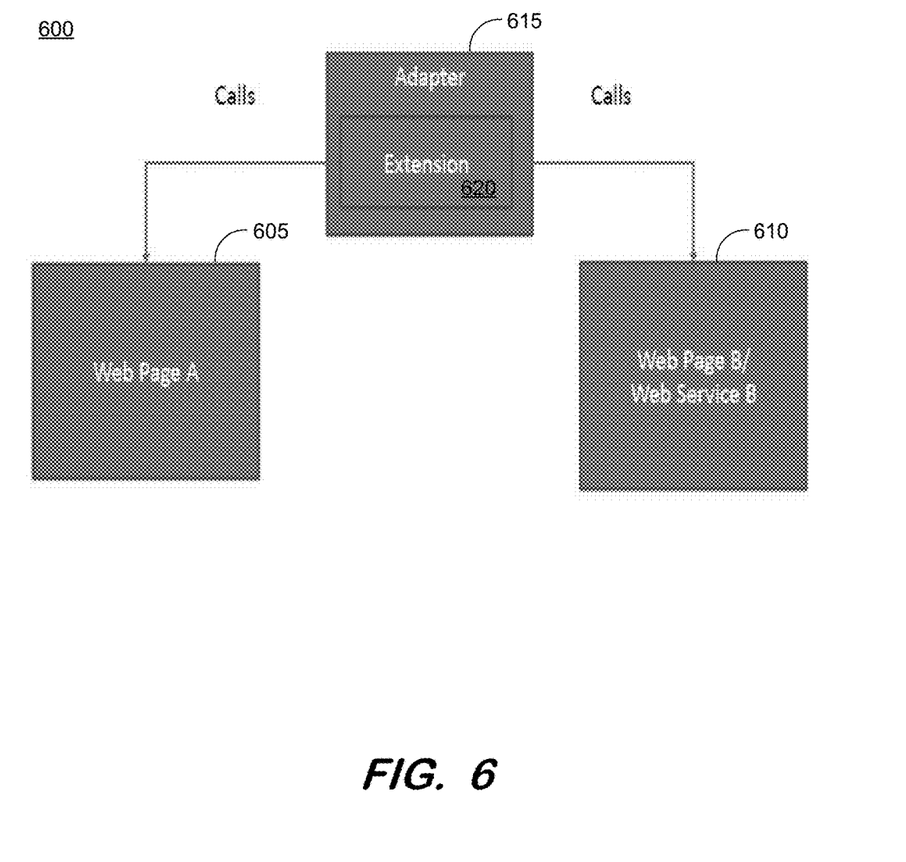
FIG. 6 is an illustrative depiction of a communication configuration.

FIG. 6 is an illustrative example of a type of communication facilitated, at least in part, by a web app adapter 615 of some embodiments disclosed herein. FIG. 6 includes a depiction of a first or source web page 605 that is granted authorized access to a target web service or web page 610 for a specific or limited purpose. The specific or limited purpose may be specified, defined, or otherwise indicated in an extension of web app adapter 615. The adapter may be designed or developed for granting specific types of access, as defined by the extension or other implementation of functionality for the adapter. In some embodiments, an extension 620 may be built into web app adapter 615, downloaded, or registered into the web app adapter. Extension 620 can be part of the web app adapter or a service registered to web app adapter 615 to facilitate the communication between the two web resources 605 and 610 that they are not configured to do by themselves. In some aspects, extension 620 may be considered as a combination of two different communications, where those communications include a communication with a first web resource (e.g., web page A, 605) and another communication with a second web resource (e.g., web page B, 610): The extension, as a web resource, may communicates with two or more different web resources to achieve a functionality that results from the combination of the communications with the two or more different web resources. In some embodiments, extension 620 may recognize the presence of a web page in a browser and in reply thereto trigger or invoke its functionality to facilitate communication between two different web resources.

Figure 7:
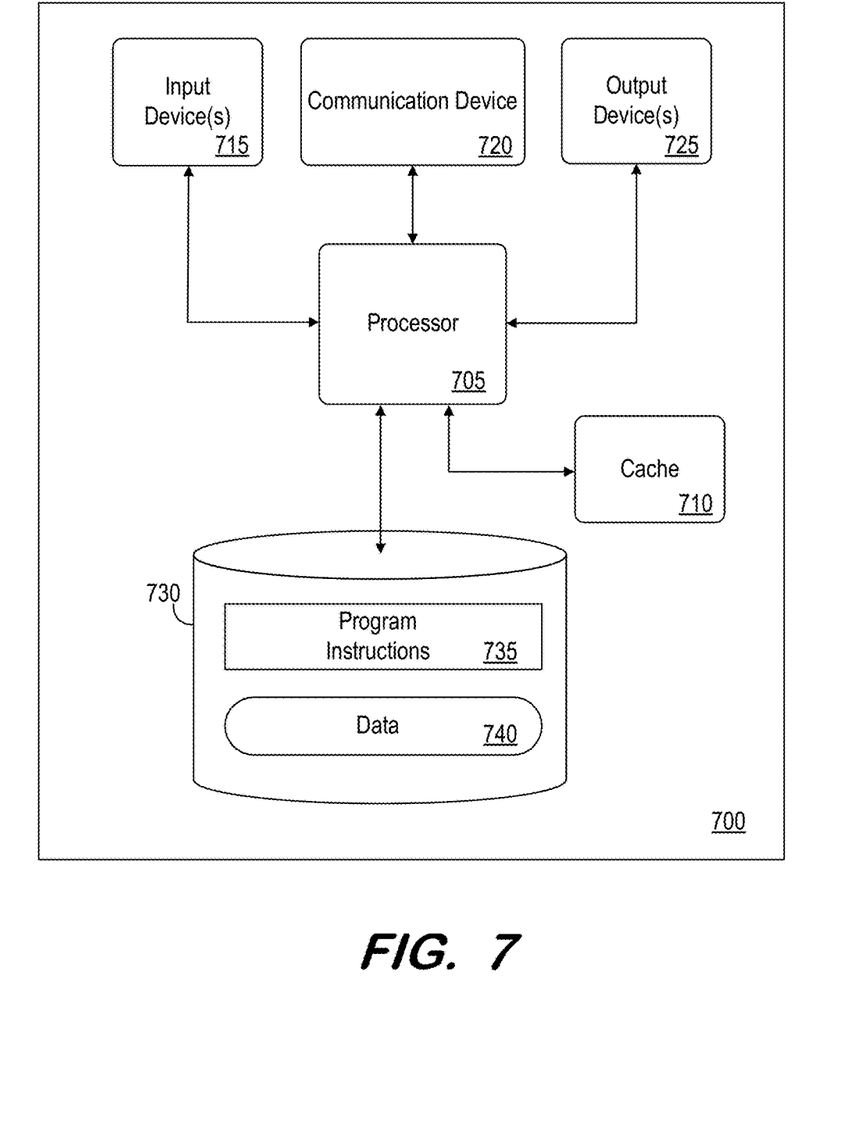
FIG. 7 is a block diagram of a computing device, in accordance with some embodiments.

FIG. 7 is a block diagram overview of a system or apparatus 700 according to some embodiments. System 700 may be, for example, associated with devices for implementing the platform and or processes disclosed herein. System 700 comprises a processor 705, such as one or more commercially available Central Processing Units (CPUs) in the form of one-chip microprocessors or a multi-core processor, coupled to a communication device 720 configured to communicate via a communication network (not shown in FIG. 7) to another device or system (e.g., a different web page or web service server). In the instance system 700 comprises a device or system, communication device 720 may provide a mechanism for system 700 to interface with a monitored entity (e.g., an application, device, system, or service). System 700 may also include a cache 710, such as RAM memory modules. The system may further include an input device 715 (e.g., a touchscreen, mouse and/or keyboard to enter content) and an output device 725 (e.g., a touchscreen, a computer monitor to display, a LCD display).

Processor 705 communicates with a storage device 730. Storage device 730 may comprise any appropriate information storage device, including combinations of magnetic storage devices (e.g., a hard disk drive), optical storage devices, solid state drives, and/or semiconductor memory devices. In some embodiments, storage device 730 may comprise a database system, including in some configurations an in-memory database.

Storage device 730 may store program code or instructions 735 that may provide processor executable instructions for managing a recovery engine of a real-time rule-based recovery platform, in accordance with processes herein. Processor 705 may perform the instructions of the program instructions 735 to thereby operate in accordance with any of the embodiments described herein. Program instructions 735 may be stored in a compressed, uncompiled and/or encrypted format. Program instructions 735 may furthermore include other program elements, such as an operating system, a database management system, and/or device drivers used by the processor 705 to interface with, for example, a monitored entity and peripheral devices (not shown in FIG. 7). Storage device 730 may also include data 740. Data 740 may be used by system 700, in some aspects, in performing one or more of the processes herein, including individual processes, individual operations of those processes, and combinations of the individual processes and the individual process operations.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

Although embodiments have been described with respect to cloud-based entities, some embodiments may be associated with other types of entities that need not be cloud-based, either in part or whole, without any loss of generality.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   receiving, at a web application adapter, a request for a first web resource to access a second web resource;
   requesting, via the web application adapter, authorization to access to the second web resource by the first web resource wherein the web application adapter is separate from the first web resource and the second web resource;
   determining whether the access to the second web resource by the first web resource had previously been granted by a prior request based on a list of authorized web resources and applications;
   in a case that the access to the second web resource by the first web resource had not been previously granted, receiving authorization to grant access to the second web resource for the first web resource;
   transmitting an application programming interface (API) call from the first web resource to the second web resource for the first web resource having authorized access to the second web resource; and
   transmitting a reply to the API call from the second web resource to the first web resource.

2. The method of claim 1, wherein the second web resource is not preconfigured for being accessed by another web resource.

3. The method of claim 1, wherein the first web resource and the second web resource may be at least one of a web page and a web service.

4. The method of claim 1, wherein the request for authorization to access the second web resource by the first web resource is for unrestricted access to the second web resource.

5. The method of claim 1, wherein the request for authorization to access the second web resource by the first web resource is defined to be a specific type of access.

6. The method of claim 5, wherein the specific type of access is limited to at least one of a communication session and a period of time.

7. The method of claim 1, wherein the first web resource and the second resource differ based on at least one of their respective domains and their respective communication protocols.

8. The method of claim 1, wherein an extension of a web app adapter facilitates the transmitting of the API call from the first web resource to the second web resource and the transmitting of the reply to the API call from the second web resource to the first web resource.

9. A non-transitory medium storing processor-executable program instructions, the medium comprising program instructions executable by a computer to:
- receive, at a web application adapter, a request for a first web resource to access a second web resource;
- request, via the web application adapter, authorization to access to the second web resource by the first web resource wherein the web application adapter is separate from the first web resource and the second web resource;
- determine whether the access to the second web resource by the first web resource had previously been granted by a prior request based on a list of authorized web resources and applications;
- in a case that the access to the second web resource by the first web resource had not been previously granted, receive authorization to grant access to the second web resource for the first web resource;
- transmit an application programming interface (API) call from the first web resource to the second web resource for the first web resource having authorized access to the second web resource; and
- transmit a reply to the API call from the second web resource to the first web resource.

10. The medium of claim 9, wherein the second web resource is not preconfigured for being accessed by another web resource.

11. The medium of claim 9, wherein the first web resource and the second web resource may be at least one of a web page and a web service.

12. The medium of claim 9, wherein the request for authorization to access the second web resource by the first web resource is for unrestricted access to the second web resource.

13. The medium of claim 9, wherein the request for authorization to access the second web resource by the first web resource is defined to be a specific type of access.

14. The medium of claim 13, wherein the specific type of access is limited to at least one of a communication session and a period of time.

15. The medium of claim 9, wherein the first web resource and the second resource differ based on at least one of their respective domains and their respective communication protocols.

16. The medium of claim 9, wherein an extension of a web app adapter facilitates the transmitting of the API call from the first web resource to the second web resource and the transmitting of the reply to the API call from the second web resource to the first web resource.

17. A system comprising:
- a first web resource;
- a second web resource; and
- a computing device comprising:
    - a memory storing processor-executable program instructions; and
    - a processor to execute the processor-executable program instructions to cause the computing device to:
    - receive, at a web application adapter, a request for a first web resource to access a second web resource;
    - request, via the web application adapter, authorization to access to the second web resource by the first web resource wherein the web application adapter is separate from the first web resource and the second web resource;
    - receive a request for the first web resource to access the second web resource;
    - request authorization to access to the second web resource by the first web resource;
    - determine whether the access to the second web resource by the first web resource had previously been granted by a prior request based on a list of authorized web resources and applications;
    - in a case that the access to the second web resource by the first web resource had not been previously granted, receive authorization to grant access to the second web resource for the first web resource;
    - transmit an application programming interface (API) call from the first web resource to the second web resource for the first web resource having authorized access to the second web resource; and
    - transmit a reply to the API call from the second web resource to the first web resource.

18. The system of claim 17, wherein the second web resource is not preconfigured for being accessed by another web resource.

19. The system of claim 17, wherein the first web resource and the second web resource may be at least one of a web page and a web service.

20. The system of claim 17, wherein the request for authorization to access the second web resource by the first web resource is defined to be a specific type of access.

21. The system of claim 20, wherein the specific type of access is limited to at least one of a communication session and a period of time.

22. The system of claim 17, wherein the first web resource and the second resource differ based on at least one of their respective domains and their respective communication protocols.

23. The system of claim 20, further comprising an extension of a web app adapter to facilitate the transmitting of the API call from the first web resource to the second web resource and the transmitting of the reply to the API call from the second web resource to the first web resource.

* * * * *